March 7, 1950 R. A. GULL 2,499,857
SIGNAL-SEEKING RECEIVER
Filed June 7, 1946
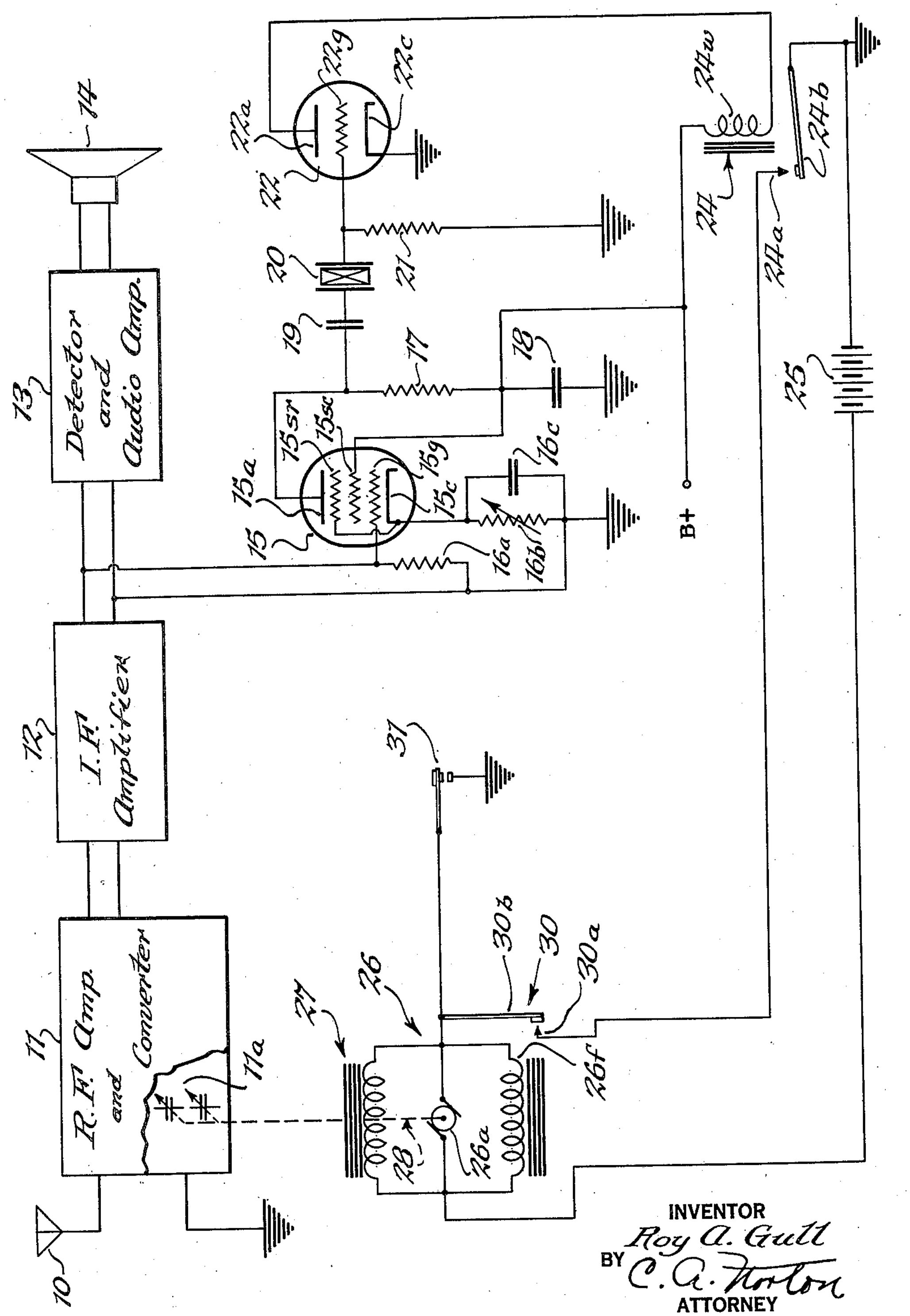
INVENTOR
Roy A. Gull
BY C. A. Norton
ATTORNEY Patented Mar. 7, 1950

2,499,857

UNITED STATES PATENT OFFICE 2,499,857

SIGNAL-SEEKING RECEIVER

Roy A. Gull, Kenmore, N. Y., assignor to Colonial Radio Corporation, Buffalo, N. Y.

Application June 7, 1946, Serial No. 674,963

4 Claims. (Cl. 250—40)

This invention relates to improvements in signal-seeking receivers, and more particularly to circuits employed therein which substantially reduce the cost thereof without seriously impairing the operation.

For the purposes of this specification, a signal-seeking receiver is defined as a receiver in which the tuning instrumentality is power driven; for instance, by an electric motor, and when set into operation, scans its tuning spectrum until an incoming signal of predetermined strength is tuned in.

At this point the incoming signal voltage operates a relay through the medium of a control tube which de-energizes the tuner motor, and in addition may declutch the tuner motor from the tuning instrumentality so that the receiver remains tuned to the desired signal. This action is purely automatic and it requires no care or attention and no skill on the part of the operator.

If the operator wishes to change to another station, all that is necessary is to momentarily operate a push button, which starts the tuner motor in operation, clutches the motor to the tuning instrumentality (if a clutch is employed), and the tuner will scan until another incoming signal of predetermined strength is received, whereupon the receiver de-energizes the motor and will remain tuned to that particular signal until the operator again sets it in operation to look for another station.

In apparatus of the type heretofore proposed, it has been suggested to utilize a portion of the output of the intermediate frequency amplifier, which portion is then passed through a limiter, and the output of the limiter is then passed through a balanced bridge circuit embodying a piezoelectric crystal tuned to the center frequency of the intermediate frequency band. The voltage from this bridge circuit is then used to control a vacuum tube having a relay in its plate circuit, and this relay controls the tuner motor and the clutch mechanism if employed.

In accordance with my invention, I achieve a considerable saving in cost by eliminating the transformer and other parts of the conventional bridge circuit, and I employ instead a resistor in the plate circuit of the limiter tube. The output of this limiter tube is then coupled to the control tube grid directly through the crystal or through the crystal in series with a blocking condenser in case it is desired to keep direct current voltage off the crystal.

From the foregoing it will be understood that it is an object of this invention to provide a simplified and more economical control circuit for stopping the receiver in response to incoming signals.

It is a further object of this invention to eliminate the transformer and other component parts of the crystal bridge circuit heretofore employed and to substitute for them a greatly simplified circuit, at considerable saving in cost.

It is a further object of this invention to reduce the cost of a signal-seeking receiver without substantially impairing the efficiency of operation.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which The single figure is a circuit diagram of an improved signal-seeking receiver in accordance with my invention.

Referring now more particularly to the drawing, 10 represents an antenna of any suitable type feeding radio frequency amplifier and converter 11. The output of the converter is then supplied to intermediate frequency amplifier 12 and thence to detector and audio amplifier 13 and loud speaker 14.

A portion of the output of intermediate frequency amplifier 12 may be impressed upon limiter 15. This may be a limiting amplifier tube having cathode 15*c*, control electrode 15*g*, screen 15*sc*, suppressor 15*sr*, and anode 15*a*. Cathode 15*c* may be connected to ground through self-biasing resistor 16*b* shunted by by-pass condenser 16*c*, and control electrode 15*g* may be connected to cathode through resistor 16*a*.

Resistor 16*b* may be made variable for the purpose of controlling the level of the incoming signal at which the receiver will stop scanning. Anode 15*a* may be connected through resistance 17 to the B+ terminal, the negative side of the B source being grounded as is usual. Screen 15*sc* may be connected directly to the B+ terminal, and the common point of the screen connection and of resistance 17 may be connected to ground through condenser 18. Suppressor 15*sr* is connected to cathode 15*c* as usual.

Anode 15*a* may be connected through blocking condenser 19 to one terminal of piezoelectric crystal 20, the other terminal of which may be connected to control electrode 22*g* of tube 22, having cathode 22*c*, control electrode 22*g*, and anode 22*a*.

Cathode 22c may be connected to ground. Control electrode 22g may be connected to ground through leak resistor 21, and anode 22a may be connected through actuating winding 24w of relay 24, and to the B+ terminal.

Relay 24 may comprise fixed front contact 24a and armature 24b closed on front contact when tube 22 passes normal space current, and open when the plate current drops. Relay 24 effects the opening of the circuit of tuner motor 26, which may have field winding 26f and armature winding 26a, and the motor may be energized from a suitable source 25. In series with relay contacts 24a and 24b, I may provide a second relay 30 having fixed contact 30a and armature 30b and arranged to lock in whenever motor field winding 26f is energized. Armature 30b may be connected to ground through push button switch 31.

A suitable magnetic clutch mechanism 27 may be interposed between shaft 28 of tuner motor 26 and tuning instrumentality 11a operating in the radio frequency amplifier and converter circuit, in such a manner that when the motor circuit is energized by closure of relay 24, the clutch mechanism is also energized to cause the motor to drive tuning instrumentality 11a, herein shown as a gang condenser.

Operation of the apparatus will now be described. Assuming that the tubes are lighted and have warmed up, and also that the receiver is tuned to an incoming signal of predetermined strength, tube 22 will be biased to or near cutoff and will be passing little or no plate current, relay 24 will be de-energized, and the motor and clutch circuit will be open between armature 24b and fixed contact 24a, and also at relay contacts 30a and 30b. The motor will, therefore, not run, and the apparatus will remain tuned to the signal which is being received.

Assuming that the operator wishes to change to another station, he will momentarily depress push button switch 31, thereby energizing the tuner motor 26, and clutching the motor to tuning instrumentality 11a and closing lock-in relay 30. The motor circuit may be traced from ungrounded side of power source 25 through motor armature and field windings 26a and 26f and switch 31 to ground. The receiver will then begin to scan its tuning spectrum. As soon as the previously received signal is de-tuned, there will be no voltage input to tube 15 and none to tube 22, which will draw normal plate current, closing relay 24. Switch 31 may then be released, but the receiver will continue to scan.

When an incoming signal of predetermined strength is received, a portion of the output of intermediate frequency amplifier 12 will be impressed upon tube 15, and passed through crystal 20 to the grid of tube 22. This voltage will be a maximum at the crystal resonant frequency, and under such conditions builds up a negative bias on grid 22g large enough to bias it to or near cutoff. Space current drops, relay 24 is opened, opening the motor circuit between armature 24b and fixed contact 24a, the motor is de-energized and the tuning instrumentality de-clutched from it, and relay 30 opens. The receiver will then remain tuned to the signal until the operator again pushes switch 31.

In case there is no objection to applying the direct current voltage to crystal 20, the blocking condenser 19 may be omitted, providing a still further saving in cost. It will be noted that this arrangement dispenses with inductance and the inductance-capacity resonance effect heretofore employed in the tuned bridge circuit coupling the repeater and control tubes. The circuit according to my invention is frequency selective, the piezoelectric crystal employed being so chosen as to resonate piezoelectrically to the center of the intermediate frequency band, but no adjustment of inductance and/or capacity, as was formerly necessary, is required.

In the specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. In a signal-seeking receiver having a variable tuning instrumentality, energizable power-operated means for varying said tuning instrumentality, manual means for causing energization of said power means to vary said tuning instrumentality, and a control system responsive to the reception of a signal of predetermined strength to deenergize said power means and stop variation of said tuning instrumentality, said system including a signal repeater tube having a control electrode fed with a portion of received signals and having an anode included in an aperiodic output circuit, a control tube having a control electrode included in an aperiodic input circuit, a relay in the space-current circuit of said control tube for interrupting the energization of said power-operated means, and a piezoelectric crystal serially connected between said output circuit of said repeater tube and said control electrode of said control tube, said crystal being series resonant at the frequency of said signal.

2. In a signal-seeking receiver having a variable tuning instrumentality, energizable power-operated means for varying said tuning instrumentality, manual means for energization of said power means to vary said tuning instrumentality, and a control system responsive to the reception of a signal of predetermined strength to deenergize said power means and stop variation of said tuning instrumentality, said system including a signal repeater tube having a control electrode fed with a portion of received signals and having an anode included in an aperiodic output circuit, a control tube having a control electrode included in an aperiodic input circuit, a relay in the space-current circuit of said control tube for interrupting the energization of said power-operated means, a piezoelectric crystal serially connected between said output circuit of said repeater tube and said control electrode of said control tube, said crystal being series resonant at the frequency of said signal, and means for isolating said crystal from unidirectional potentials appearing in said output circuit of said repeater tube.

3. In a signal-seeking receiver having a variable tuning instrumentality, energizable power-operated means for varying said tuning instrumentality, manual means for energization of said power means to vary said tuning instrumentality, and a control system responsive to the reception of a signal of predetermined strength to deenergize said power means and stop variation of said tuning instrumentality, said system including a signal repeater tube having a control electrode fed with a portion of received signals and having an anode included in an aperiodic output circuit, a control tube having a control electrode included in an aperiodic input circuit, a relay in the space-current circuit of said control tube for interrupting the energization of said power-operated means, a piezoelectric crystal serially connected between said output circuit of said repeater tube and said control electrode of said control tube, said crystal being series resonant at the frequency of said signal, and a blocking condenser serially connected with said crystal to isolate said crystal from unidirectional potentials appearing in said output circuit of said repeater tube.

4. In a signal-seeking receiver having a variable tuning instrumentality, energizable power-operated means for varying said tuning instrumentality, manual means for energization of said power means to vary said tuning instrumentality, and a control system responsive to the reception of a signal of predetermined strength to deenergize said power means and stop variation of said tuning instrumentality, said system including a signal repeater tube having a control electrode fed with a portion of received signals and having an anode included in an aperiodic output circuit, a control tube having a control electrode and cathode included in an aperiodic input circuit in which said control electrode has zero fixed bias with respect to said cathode, a relay in the space-current circuit of said control tube for interrupting the energization of said power-operated means, a piezoelectric crystal serially connected between said output circuit of said repeater tube and said control electrode of said control tube, said crystal being series resonant at the frequency of said signal and said input circuit of said control tube having with said crystal a time constant of sufficiently large value with relation to the periodicity of said signal as to develop in said input circuit of said control tube by rectification of said signal a self-bias potential varying with the amplitude of the signal applied to said control tube.

ROY A. GULL.

REFERENCES CITED

The following references are of record in the file of this patent:

UNITED STATES PATENTS

| Number | Name | Date |
|---|---|---|
| 2,044,645 | Stapleton et al. | June 16, 1936 |
| 2,231,806 | Goldsborough | Feb. 11, 1941 |
| 2,233,706 | Kalmus | Mar. 4, 1941 |
| 2,304,871 | Andrews | Dec. 15, 1942 |